United States Patent Office 3,336,468
Patented Aug. 15, 1967

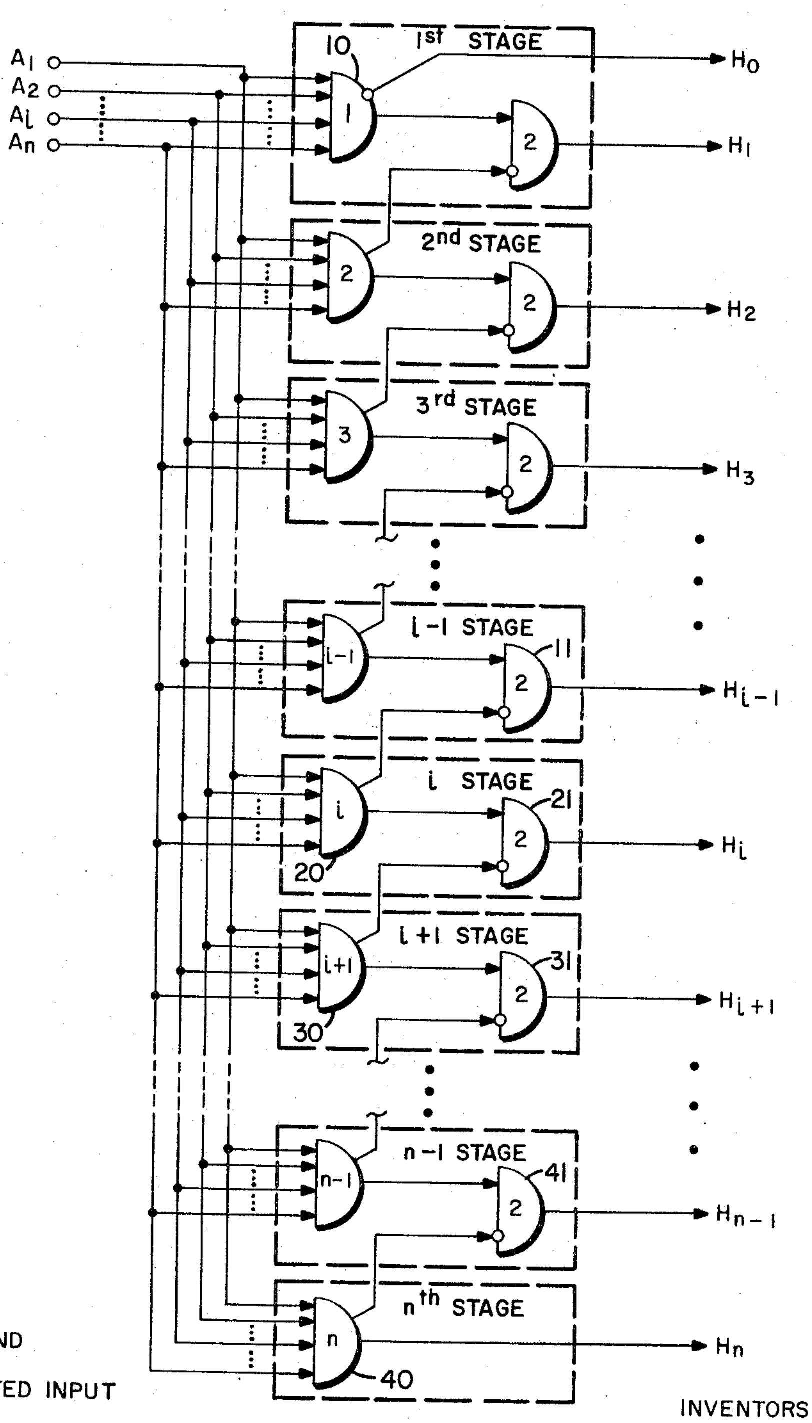
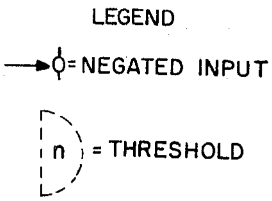
INVENTORS
MARIUS COHN
JOHN R. LINDAMAN
BY Thomas J. Nikolai
ATTORNEY

3,336,468

HAMMING MAGNITUDE DETERMINATOR USING BINARY THRESHOLD LOGIC ELEMENTS

John R. Lindaman and Marius Cohn, Minneapolis, Minn., assignors to Sperry Rand Corporation, New York, N.Y., a corporation of Delaware Filed Aug. 13, 1965, Ser. No. 479,410
5 Claims. (Cl. 235—155)

This invention relates to the determination of the Hamming magnitude of a binary word and, more particularly, provides improved means for determining the number of one's contained in a binary word.

The Hamming magnitude of a binary word is defined as the number of ones contained in the word and is sometimes referred to as the Hamming distance of the word from zero. The Hamming magnitude of a binary word and the means for making such a determination are currently utilized in error detection and correction such as set forth in an article by R. W. Hamming entitled, "Error Detecting and Error Correcting Codes," published in the Bell System Technical Journal, vol. XXVI, No. 2, pp. 147–160, April 1950.

In determining the Hamming magnitude of a binary word conventional prior art devices would first serialize the word and then pass the word through a one's counter to determine the number of one's contained therein. Devices of this type require relatively expensive hardware to effect and the time required to form such a count is very large when compared to a computer operating cycle.

When the word, whose Hamming magnitude is to be determined, is of the form $A_n \ldots A_i \ldots A_1$, it is observed that the Hamming magnitude of A is $p$, $o \leqslant p \leqslant n$, if and only if $$\sum_{i=1}^{n} A_i \geq p \text{ and } \sum_{i=1}^{n} A_i < p+1$$

It is proposed by this invention to reduce the cost of hardware and decrease the time necessary to generate a signal representative of the Hamming magnitude of a binary word by utilizing this observation and its arithmetical equivalents.

The invention is effected by employing multi-input binary threshold logic elements. There are a variety of cuits available, capable of performing the logical threshold function, which are well-known in the art (such as set forth by E. Goto in "The Parametron, A Digital Computing Element Which Utilizes Parametric Oscillation." Proc. IRE August 1959, page 1310; and W. J. Wray in "Worst Case Design of Variable-Threshold TRL Circuits," IRE Transactions on Electronic Computers, vol. EC–11, No. 3, pp. 382–390; June 1963) and these circuits, of themselves, do not constitute a part of this invention.

The output, K, of a binary threshold logic element having $n$ inputs, $X_n, X_{n-1} \ldots X_i, \ldots X_2, X_1$ and threshold $t$, $1 \leqslant t \leqslant n$, can be represented as follows:

$$K = X_n{}^t X_{n-1}{}^t \ldots X_i{}^t \ldots X_2{}^t X_1$$

The value of the binary threshold logic function, K, is determined as follows:

$K=1$ if $$\sum_{i=1}^{n} X_i \geq t$$

and $K=0$ if $$\sum_{i=1}^{n} X_i < t$$

By generating signals in accordance with the logical function;

$$Hp = (A_n{}^p \ldots A_i{}^p \ldots A_1)^2 \overline{(A_n{}^{p+1} \ldots A_i{}^{p+1} \ldots A_1)}$$

the Hamming magnitude of A can be detected. $H_p$ will represent a logical "one" if and only if $$\sum_{i=1}^{n} A_i \geq p \text{ and } \sum_{i=1}^{n} A_i < p+1$$

These signals are generated utilizing binary threshold logic elements. In the above equation, the superscript "$p$" represents the threshold of the first element to which the A signals are applied, the superscript "$p+1$" represents the threshold of the second element to which the A signals are applied and the superscript "2" represents the threshold of the third element to which the true output of the first element and the negated output of the second element are applied. Inspection of the drawing indicates that the Hamming magnitude of a binary word can be determined in only two logic levels utilizing only $2n-1$ elements.

Thus it is seen that by implementing the observation set forth above with binary threshold logic elements a signal representative of the Hamming magnitude of a binary word can be generated in a relatively short period of time utilizing a small amount of hardware. The novel features which are considered characteristic of this invention are set forth with particularity in the appended claims. The invention itself both as to its organization and method of operation, as well as additional advantages thereof, will be best understood from the following description when read in connection with the accompanying drawing.

The drawing is a logical block diagram of a preferred embodiment of a Hamming magnitude determinator designed in accordance with this invention. In this drawing each of the blocks represent a binary threshold logic element. The numeral appearing within each of the blocks represents the threshold, $t$, of the element. Arrowheads indicate direction; each normal arrowhead represents a normal signal; each small circle "arrowhead" represents a negated signal.

With reference now to the drawing, a logical block diagram of a Hamming magnitude determinator according to the present invention is shown. The full magnitude determinator comprises $n$ stages. Each of the stages, $S_i, i=1, 2, 3, \ldots n-1$, comprises two binary threshold logic elements arranged to provide an output signal in two logic levels. One of the elements of each stage generates a signal in one level of logic. The second element of each stage utilizes the signals generated in the first logic level of that particular stage and the next higher order stage to generate a signal in the second logic level. in the $i^{th}$ stage, $S_i$, the input terminals of threshold element 20 are coupled such that the element is capable of receiving $n$ input signals representative of $A_n \ldots A_i \ldots A_1$. Threshold element 20 generates an output signal in the first logic level and has a threshold of "$i$." The output terminal of element 20 is coupled to the input terminals of both element 11 of the $i$–1 stage, $S_{i-1}$, and element 21 of the $i^{th}$ stage $S_i$. Threshold element 30, of the $i+1$ stage, $S_{i+1}$, also generates a signal in the first logic level and has a threshold of "$i+1$." The output terminal of element 30 is coupled to the input terminals of both element 21 of the $i^{th}$ stage, $S_i$, and element 31 of the $i+1$ stage, $S_{i+1}$. Threshold element 21 generates an output signal in the second logic level and has a threshold of two (2).

The $n^{th}$ stage, $S_n$, comprises one threshold element, 40, the input terminals of which are coupled such that the element is capable of receiving $n$ input signals representative of $A_n \ldots A_i \ldots A_1$. Threshold element 40 generates an output signal in one logic level and has a threshold of "$n$." The output terminal of element 40 is coupled to the input terminal of element 41, of the $n$–1 stage, $S_{n-1}$, and also provides the output of the $n^{th}$ stage, $S_n$.

In operation each of the stages, $S_i$, $i=1, 2, \ldots n-1$ of the magnitude determinator of the drawing receives signal representations of $A_n \ldots A_i \ldots A_1$. In the $i^{th}$ stage, $S_i$, threshold element 20 receives signal representations of $A_n \ldots A_i \ldots A_1$ and generates a signal in accordance with the logical function, $A_n^i \ldots A_i^i \ldots A_1$, which is transmitted to threshold element 21 of the $i^{th}$ stage, $S_i$, and transmitted to and inverted by (or inverted and transmitted to) threshold element 11 of the $i$–1 stage, $S_{i-1}$. Threshold element 30 of the $i+1$ stage, $S_{i+1}$, receives signal representations of $A_n \ldots A_i \ldots A_1$ and generates a signal in accordance with the logical function, $A_n^{i+1} \ldots A_i^{i+1} \ldots A_1$, which is transmitted to and inverted by (or inverted and transmitted to) element 21 of the stage, $S_i$, and transmitted to threshold element 31 of the $i+1$ stage, $S_{i+1}$.

Threshold element 21 receives signal representations of the logical functions, $A_n^i \ldots A_i^i \ldots A_1$ and $A_n^{i+1} \ldots A_i^{i+1} \ldots A_1$, and generates a signal in accordance with the logical function, $$H_i=(A_n^i \ldots A_i^i \ldots A_1)^2(\overline{A_n^{i+1} \ldots A_i^{i+1} \ldots A_1})$$

which is representative of the output of each of the stages, $S_i=1, 2, \ldots n-1$. The logic notation used in this equation is similar to that described above.

In the $n^{th}$ stage, $S_n$, threshold element 40 receives signal representations of $A_n \ldots A_i \ldots A_1$, and generates a signal in accordance with the logical function, $A_n \ldots A_i \ldots A_1$, which is transmitted to and inverted by (or inverted and transmitted to) threshold element 41 of the $n$–1 stage, $S_{n-1}$, and is also representative of $H_n$, the output of the $n^{th}$ stage.

A signal representation of $H_0$ is obtained by inverting the signal output of element 10 of the first stage, $S_1$.

One, and only one, of the signals, $H_i$, will represent a logical "one." The particular $H_i$ that represents a logical "one" will indicate that the Hamming magnitude of the input word is $i$, where $i=0, 1, 2 \ldots n$. That is, the output will be fully decoded and $H_i$ will represent a logical "one" if and only if $$\sum_{i=1}^{n} A_i = i$$

If the input word is a function of two or more variables, the output of the Hamming distance determinator will give interesting results. For instance, if the input word is representative of the exclusive-OR function of two independent variables X and Y (ie:

$$A_i=X_i \wedge Y_i$$

which is defined as "one" if and only if $X_i$ and $Y_i$ disagree), the output of the determinator will be indicative of the Hamming magnitude of the difference between binary words X and Y. If the input word is representative of the AND function of two independent variables X and Y (i.e.: $A_i=X_i \cdot Y_i$, which is defined as "one" if and only if $X_i=Y_i=1$) the output of the determinator will be indicative of the number of digit orders of X and Y which agree and are "one." It is to be understood that these input functions and their associated outputs are merely exemplary of the unlimited number of possibilities and are not to be construed as limiting.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

What is claimed is:

1. A Hamming magnitude determinator for generating a signal, $H_i$, representative of the number of "one's" contained in a binary word of the form $A_n \ldots A_i \ldots A_1$, comprising:

$n$ stages, $S_i$, $i=1, 2 \ldots n$, each of said stages, $S_i$, $i=1, 2 \ldots n-1$, coupled only to the next higher order stage, $S_{i+1}$, for generating a signal representative of $H_i$, comprising;

a first threshold circuit means for receiving signal representations of $A_n \ldots A_i \ldots A_1$ and generating an output signal, and a second threshold circuit means receiving said output signal and a signal representation of the logical function $A_n^{i+1} \ldots A_i^{i+1} \ldots A_1$ generated by the first binary threshold element of the next higher order stage, $S_{i+1}$, and generating a signal representative of $H_i$ in accordance with the logical function, $$H_i=(A_n^i \ldots A_i^i \ldots A_1)^2(\overline{A_n^{i+1} \ldots A_i^{i+1} \ldots A_1})$$

where the superscript "$i$" represents the threshold of the first threshold circuit, the superscript "$i+1$" represents the threshold of the threshold circuit in the next higher order stage and the superscript "2" is the threshold of the second threshold circuit receiving the true output from the first threshold circuit and the negated output of the first threshold circuit of the next higher order stage, said nth stage, $S_n$, for generating a signal representative of $H_n$, comprising:

a single threshold circuit means for receiving signal representations of $A_n \ldots A_i \ldots A_1$ and generating an output signal in accordance with the logical function, $$H_n=A_n^n \ldots A_i^n \ldots A_1$$

2. A Hamming magnitude determinator as defined in claim 1 in which a signal representative of $H_0$ is generated in said first stage, $S_1$, in accordance with the logical function, $$H_n=\overline{A_n^1 \ldots A_i^1 \ldots A_1}$$

3. A Hamming magnitude determinator as defined in claim 2 in which each of said generating means is a binary threshold logic element.

4. A signal generating stage, $S_i$, $i=2, 3, \ldots n-1$, for generating a signal, $H_i$, corresponding to a binary word of the form $A_n \ldots A_i \ldots A_1$, comprising;

a first threshold circuit means for receiving signal representations of $A_n \ldots A_i \ldots A_1$ and generating an output signal, and a second threshold circuit means coupled to said first threshold circuit means for utilizing said output signal and a signal representative of the logical function, $A_n^{i+1} \ldots A_i^{i+1} \ldots A_1$ to generate a signal representative of $H_1$ in accordance with the logical function, $$H_i=(A_n^i \ldots A_i^i \ldots A_1)^2\overline{(A_n^{i+1} \ldots A_i^{i+1} \ldots A_1)}$$

where the superscript "$i$" represents the threshold of said first threshold circuit, the superscript "$i+1$" represents the threshold of the threshold circuit generating said signal representative of said logical function and the superscript "2" represents the threshold of said second threshold circuit.

5. A Hamming magnitude determinator as defined in claim 4 in which each of said generating means is a binary threshold logic element.

References Cited

UNITED STATES PATENTS

| | | | |
|---|---|---|---|
| 3,091,392 | 5/1963 | Arya | 235—177 |
| 3,275,812 | 9/1966 | Coates et al. | 235—176 |

OTHER REFERENCES

Griffin, J. F. Jr., Decoder Driver For Indicator Tube, IBM Technical Disclosure Bulletin, vol. 3 No. 2 July 1960, p. 38–39.

MALCOLM A. MORRIS, *Primary Examiner.*

V. SIBER, *Assistant Examiner.*

UNITED STATES PATENT OFFICE
CERTIFICATE OF CORRECTION

Patent No. 3,336,468 August 15, 1967

John R. Lindaman et al.

It is hereby certified that error appears in the above numbered patent requiring correction and that the said Letters Patent should read as corrected below.

Column 1, line 47, for "cuits" read -- circuits --; line 60, for "$X_i t$" read -- $X_i^t$ --; column 3, line 42, for "$S_i$=1,2," read -- $S_i$, i=1,2, --; column 4, line 61, for "$H_n=A_n^1$ " read -- $H_o=A_n^1$ --.

Signed and sealed this 1st day of October 1968.

(SEAL)
Attest:

Edward M. Fletcher, Jr.
Attesting Officer

EDWARD J. BRENNER
Commissioner of Patents